Dec. 18, 1951  E. L. ERICKSON ET AL  2,579,229
PUSH-PULL HOE

Filed Dec. 10, 1948  2 SHEETS—SHEET 1

INVENTORS
ELMER L. ERICKSON
ALBERT N. HUME
BY Ralph L. Stevens
ATTORNEY

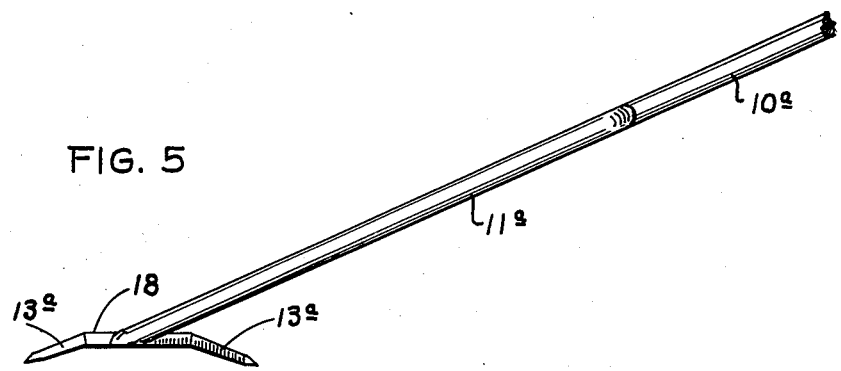
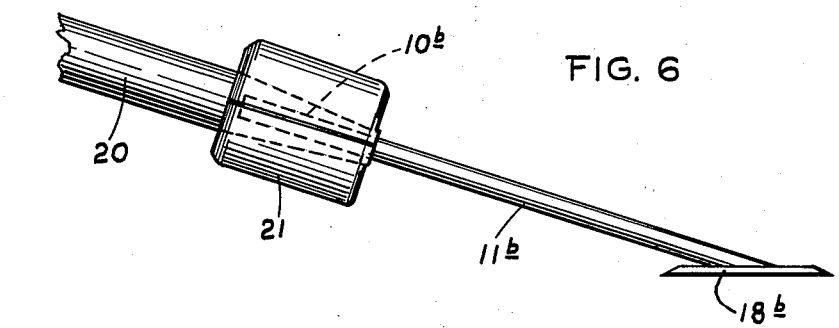
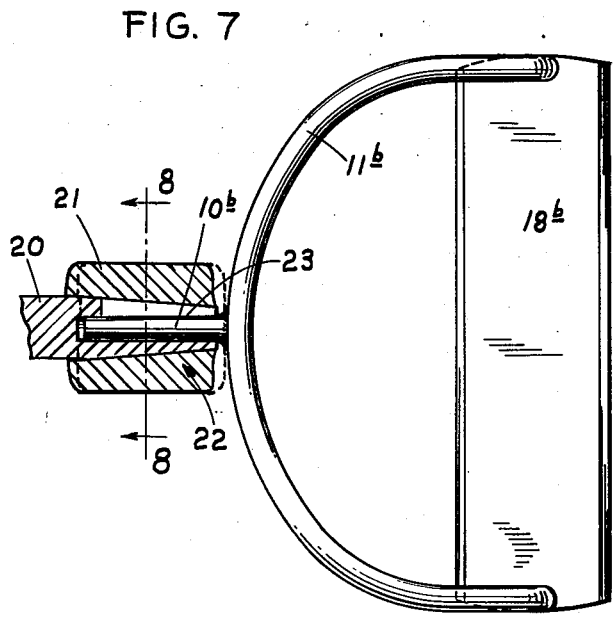
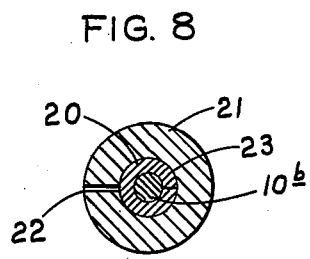

Patented Dec. 18, 1951

2,579,229

UNITED STATES PATENT OFFICE 2,579,229

PUSH-PULL HOE

Elmer L. Erickson and Albert N. Hume,
Brookings, S. Dak.

Application December 10, 1948, Serial No. 64,676

1 Claim. (Cl. 97—68)

This invention relates to a hand-operable cultivating and weeding implement of the type commonly classed as a hoe, and particularly to an improved hoe which can be pushed and pulled through the soil with a minimum of tiring effort but with very effective results.

It is a primary object of the present invention to devise a hoe having two definite blades or downwardly turned edges set at an angle to each other and to the surface soil to accomplish several important results, including the following:

1. The advancing edge on either stroke (push or pull) is held in soil penetration without changing the handle inclination when shifting from one stroke to another.

2. The following or trailing edge serves as a depth gauge preventing the entering edge from going in too deeply.

3. The trailing edge tends to sharpen itself by action of the soil against its under surface.

4. The blades operate close to the surface, thus moving a minimum of soil, conserving moisture and avoiding the transplanting of weeds from subsequent regrowth.

It is another very important object of this invention to provide a hoe head of the character above mentioned wherein there is an open center section between the cutting blades or edges. This open section is of such width that the weeds float over it while the soil passes downwardly through it to settle below the weeds and thus cause death of the weeds by desiccation. The opening further assists in scouring the blades to keep them clean.

A further object of our invention resides in the provision of blade ends rounded or beveled, and blunted, to permit rapid action without danger to the cultivated plants as the hoe is pushed and pulled. This objective in no way interferes with occasional sharpening of outer edges of both blades.

These and other objects of the present invention should clearly appear from a study of the following description when taken in conjunction with the accompanying drawings, wherein:

Fig. 5 is a side elevation of a modified form of the invention.

Fig. 6 is a view similar to Fig. 5, with the blade lengthened and modified, and with a detachable weight included, as it might be included in any of the several embodiments.

Fig. 7 is a plan view of the device of Fig. 6, with the weight shown in longitudinal section.

Fig. 8 represents a cross section taken along the plane of line 8—8, Fig. 7.

Figure 1:
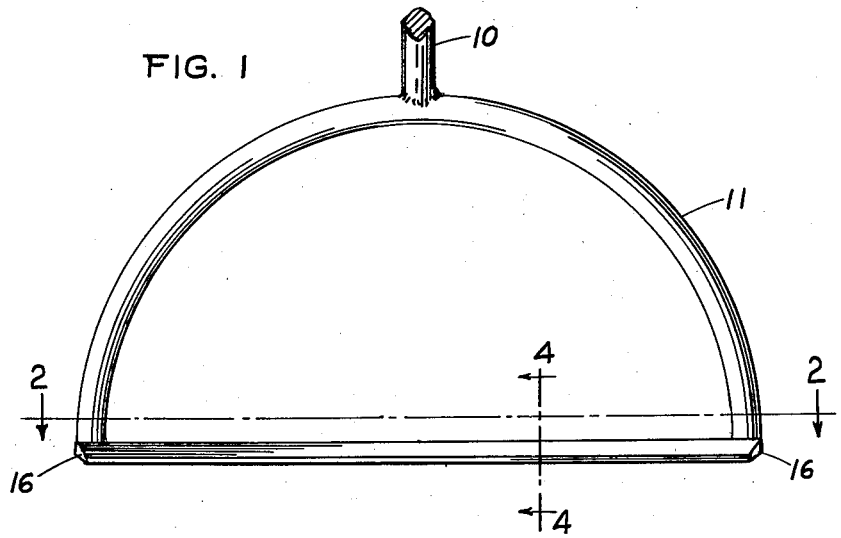
Fig. 1 is an elevational view of a preferred form of hoe head which may, for example, be approximately 8 inches wide and approximately 4 inches high.
Figure 2:
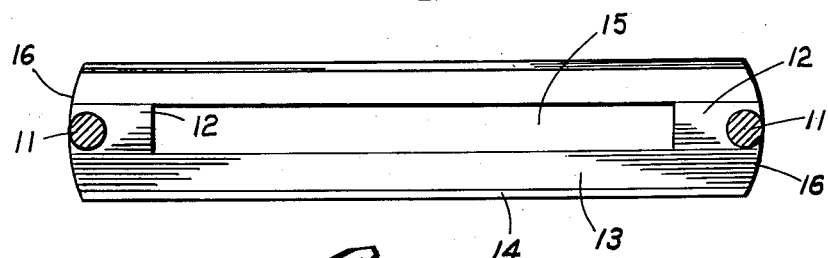
Fig. 2 represents a section taken upon the horizontal plane of line 2—2, Fig. 1.
Figure 3:
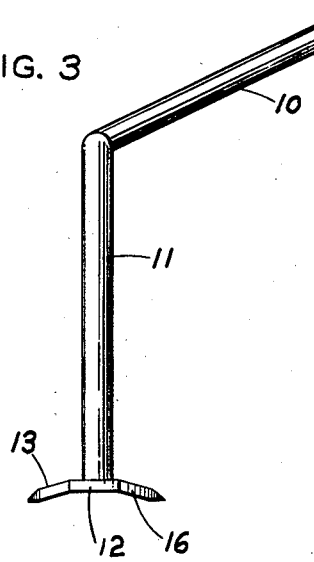
Fig. 3 is a side elevational view of the device of Figs. 1 and 2.
Figure 4:
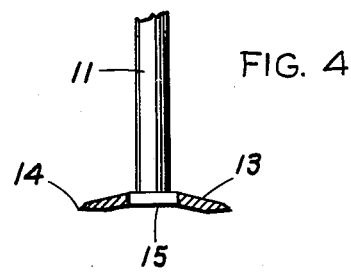
Fig. 4 shows a section taken across the blades on line 4—4, Fig. 1.

With continued reference to the drawings and, for the moment, particularly to Figs. 1 to 4, the preferred form of cultivating and weeding head comprises a metal shank 10, an integral arch 11 bisected by the shank, a pair of bridge plates 12 to which the ends of the arch are securely united, and a pair of substantially identical, spaced blades 13 secured to the plates 12 so as to become integral parts thereof on opposite sides of the arch.

The shank 10 is designed to be inserted into the lower end of a hoe handle or to be otherwise secured thereto in any suitable manner; and the shank may be formed in one piece with the arch, or brazed or welded or otherwise secured thereto to form a rigid non-brittle structure. The ends of the arch 11 may be brazed or welded to the plates 12, or may have integral feet corresponding to said plates; and, although the blades 13 are shown united to the plates (or feet) by brazing or welding they may be replaceably attached to the plates (or feet) by means of bolts, screws, wedges, spring catches, etc.

The blades 13 are formed of durable self-sharpening steel and have sharp cutting edges 14. They are narrow and so spaced apart as to provide a very important, elongated slot or gap 15 between the relatively short plates (or feet) 12. The blades are inclined upwardly from their outer cutting edges to produce beveled under surfaces that have several functions, one of which is to feed the traversed soil through the slot 15. The angle of blade inclination may be varied at the factory, or on the spot by suitable connecting means, to suit the soil and crop or weed conditions.

This is a push-pull hoe which may be stroked back and forth between rows of plants, in contradistinction to the conventional chop-chop hoe, and it is desirable that the blades be moved to cultivate the soil near its surface and to remove weeds without damaging the planted crop while coming close to the plants. Accordingly, the ends of the blades are made dull and rounded, as at 16, so that in case they accidentally come into contact with the plant, the latter will remain uninjured. To further this end the plates 12 (or feet) may extend laterally beyond the blades, to receive the ends of arch 11 beyond the blade ends (as in Fig. 5).

In operation, the hoe head is pulled and pushed back and forth through the soil, either with or without lifting it from cultivating engagement with the soil; and, preferably, the operator works backwardly to avoid compaction by his shoes of the cultivated soil and compression of removed weeds into the soil to permit their regrowth. When the head passes through the weeds there is no tendency to bury them. On the contrary, soil is distributed through the slot 15 below the weeds, and the trailing edge further tends to keep the weeds on the surface for destruction by desiccation.

The angle between blades causes automatic penetration without going excessively deep and may be varied to suit soil and weed conditions. Likewise, the angle between the shank 10 and the arch 11 may be varied to suit such conditions, as now will be seen. The hoe of Figs. 1 to 4 is usually relatively small, designed for light work; the hoes of Figs. 5 to 8 are heavier, being designed for action where the weeds are older or where the soil is difficult to penetrate.

In Fig. 5, the blade sections 13a have a greater inclination and are joined by an intermediate section 18 which may or may not be slotted and which may or may not be rounded at its ends. The arch 11a preferably is secured with the blunt or round ends of its arms entirely outside the ends of the blades; and it is inclined toward the hoe handle, with its shank 10a likewise inclined. This hoe is effective under conditions where greater pushing and pulling efforts are required.

The modified form of Figs. 6-8 is similar to that of Fig. 5, the main differences being that a single flat, double-edged blade 18b is substituted and that the head is weighted to keep the blade at a selected depth in the soil during the stroking action. The shank 10b of the arch 11b is fitted into the tapered end of a handle 20 and clamped therein by a weight 21 formed of heavy metal. The latter is internally tapered complemental to the taper of the handle and may be split longitudinally at 22. The handle end may be slotted at 23. The weight is detachable, preferably, and may be larger or of any desired size, and it should be understood that a similar arrangement may be utilized to attach the other hoe heads to handles.

The weight is mounted by first placing it in the broken line position seen in Fig. 7, then pushing shank 10b into the handle with a rather snug fit, and then forcing the weight outwardly to its full line position, wherein it tends to close the slot 23 and grip the shank securely. Of course, the slot 23 might be eliminated and the shank 10b firmly anchored in the handle, in which event the weight could consist of a piece of split, soft material, such as lead, rolled about the handle and deformed to provide a heavy substantially cylindrical mass.

Obviously, some changes may be made in the illustrated forms without departing from the spirit of the invention and, therefore, we wish to be limited, as is customary, only by the scope of the appended claim.

What is claimed is:

In a push-pull hoe, a head comprising an elongated twin blade unit wherein the blades are rigidly joined by narrow bridge elements at their ends, said blades inclined upwardly from their cutting edges toward each other and spaced apart sufficiently by said bridge elements to form an unbroken elongated gap through which loose soil but not weeds may pass downwardly, and an operating arch having its ends immovably secured to said bridge elements.

ELMER L. ERICKSON.
ALBERT N. HUME.

REFERENCES CITED

The following references are of record in the file of this patent:

UNITED STATES PATENTS

| Number | Name | Date |
| --- | --- | --- |
| 54,916 | Jenkins | May 22, 1866 |
| 317,523 | Dronne | May 12, 1885 |
| 877,913 | Crummer | Feb. 4, 1908 |
| 1,279,704 | Jones | Sept. 24, 1918 |
| 1,886,178 | Goddard | Nov. 1, 1932 |

FOREIGN PATENTS

| Number | Country | Date |
| --- | --- | --- |
| 3,999 | Great Britain | Feb. 17, 1913 |
| 8,044 | Great Britain | Apr. 21, 1893 |